United States Patent [19]

Maher

[11] 3,787,220

[45] Jan. 22, 1974

[54] MOLDED ARTICLES AND FILMS
[75] Inventor: George G. Maher, Dunlap, Ill.
[73] Assignee: The United States of America as represented by the Secretary of Agriculture, Washington, D.C.
[22] Filed: Jan. 24, 1973
[21] Appl. No.: 326,220

Related U.S. Application Data
[62] Division of Ser. No. 190,319, Oct. 18, 1971, Pat. No. 3,730,829.

[52] U.S. Cl. ................................. 106/214, 162/175
[51] Int. Cl. ... D21h 3/28, C08b 25/02, C08b 27/04, C08b 27/14
[58] Field of Search 106/210, 213, 214; 260/17.3 R, 260/233.5

[56] References Cited
UNITED STATES PATENTS
3,385,719  6/1968  Lancaster ........................ 260/233.5
3,238,193  3/1966  Tuschhoff ........................ 260/233.5
3,531,465  9/1970  Bridgeford ....................... 260/233.5
3,721,523  3/1973  Tesoro ................................ 106/210
3,730,829  5/1973  Maher ............................. 260/233.5

Primary Examiner—Theodore Morris
Attorney, Agent, or Firm—Howard Silverstein; David G. McConnell

[57] ABSTRACT

A method is disclosed for the preparation of a variety of molded articles and films prepared from gels of crosslinked starch xanthate.

A nonexclusive, irrevocable, royalty-free license in the invention herein described, throughout the world for all purposes of the United States Government, with the power to grant sublicenses for such purposes, is hereby granted to the Government of the United States of America.

5 Claims, No Drawings

MOLDED ARTICLES AND FILMS

This is a division of application Ser. No. 190,319 filed 10/18/71 now U.S. Pat. No. 3,730,829.

BACKGROUND OF THE INVENTION

This invention relates to the preparation of molded articles and films having properties which vary from hard and brittle to soft and pliable. More specifically, the invention relates to products prepared from crosslinked starch xanthate. Reactions which crosslink carbohydrates, especially polysaccharides, through their hydroxyl groups are fairly well known. Crosslinked dextran, molecular sieves, and crease-resistant cotton cellulose fibers are among the more important products of this type. However, the amount of crosslinking or the degree of substitution (D.S.) attained in these products in quite low. Furthermore, to obtain the desired results in preparing the above-mentioned products, it is often necessary to use various combinations of organic solvents, catalysts, emulsifiers, or suspension stabilizers (when water is present), application of heat, and curing of products.

Crosslinking of sodium starch xanthate has been achieved by reaction with polyethylenimine, polyacrolein, and low molecular weight polyamines. Many of the gels formed in these reactions were fluid, but some were rigid enough to support themselves without flowing when the reaction vessel was inverted. However, these rigid gels were not firm enough to maintain the shape of a mold when removed therefrom and when dried, they resulted in gummy masses. Gels prepared from polyacrolein and sodium starch xanthate (D.S. 0.22-0.44) were exceptional in that they dried to hard, brittle, glasslike products. In the prior art teachings of the above reactions, it is indicated that the reactice moiety of the crosslinking agents react only with xanthate groups in sodium starch xanthate and that, while a long chain between crosslinking sites is not always necessary for gel formation, the molecular size of the connecting bridge should be considerable to impart insolubility to the product.

I discovered that hard products, such as molded articles and films, which retain the shape of a mold were formed when sodium starch xanthate having a xanthate D.S. of from about 0.05 to about 0.60 was reacted with an excess of an alkyl diglycidyl ether such as 1,4-butanediol diglycidyl ether or an alkyl diepoxide such as butadiene diepoxide in an alakaline aqueous medium. The excess of the diepoxides was from about 2 to about 5 times the stoichiometric amount of one epoxide group per xanthate group in the sodium starch xanthate starting material. Placticizers were added in amounts of 0 to 200 percent of the dry weight of the sodium starch xanthate. The reaction was conducted in a mold for a time sufficient to allow formation of a solid mass. This solid mass was removed from the mold and allowed to dry. In some instances dyes or fillers were added to the reaction mixture in sufficient quantity to impart color to the molded articles. Materials such as brom cresol purple, carbon black, potassium permanganate, sudan black, congo red, halopont blue, methylene blue, brom thymol blue, cresol red, or any other compatible compound which can impart color can be used in this manner.

The reaction of sodium starch xanthate with diepoxides is homogenous, very rapid (at least at the start), requires no heating or catalyst, and takes place in a simple, alkaline water medium. The crosslinked products first form opaque, gel-like masses that coalesce to solids which, as they form, come out of solution in one piece or mass, and the residual liquid medium quickly exudes or weeps from the solids. The solid masses dry to form materials which have properties that vary from soft and flexible to tough and nonflexible to brittle depending on the ratio of xanthate to diepoxide. Molded products retain sharp clear letters when the reaction takes place in a mold having embossed lettering. At early stages of formation, the instant products could lend themselves to compression molding. Colors of nondyed products range from white to yellow depending on the amount of diepoxide reacted. The products do not melt, but they do burn freely. They are essentially insoluble in such solvents as benzene, toluene, hexane, dioxane, methyl cellosolve, ethyl ether, ethanol, butanediol, acetone, glacial acetic acid, pyridine, chloroform, carbon tetrachloride, and dimethyl sulfoxide.

The simple molding characteristics of the instant products make them especially useful for casting and molding small pieces, sealants, films, adhering films, reinforced fiber cloths and mats, protective coverings of films as reinforced film fiber, plain or reinforced gaskets, stretchable gaskets, and pliable fillers.

I have further discovered that paper having increased burst, wet and dry strength, and fold endurance, results from first reacting sodium starch xanthate having a xanthate D.S. of from about 0.1 to about 0.6 with an excess of an alkyl diglycidyl ether or an alkyl diepoxide, the excess being from 2 to 5 times the stoichiometric amount of one epoxide group per xanthate group in the sodium starch xanthate; then adding the resulting reaction mixture to a papermaker's pulp suspension in amounts that result in levels of addition of from about 2.5 to 10 percent based on total weights of reactants and dry pulp; then allowing the resulting pulp mixture to stand from about 0.5 to about 18 hours; forming water-laid paper from the pulp mixture; and finally drying the paper.

Paper having essentially the same properties as above can be prepared by separately adding the same quantities of reactants to the papermaker's pulp, allowing the mixture to stand from 0.5 to 18 hours, and finishing the process in the same manner.

DETAILED DESCRIPTION OF THE INVENTION

The crosslinking reaction of sodium starch xanthate with an alkyl diepoxide is the basic element in this invention. Therefore, for the purpose of the invention, conducting the reaction in a mold to form a molded article is considered to be equivalent to conducting the reaction on a flat surface to form a film.

Sodium starch xanthate solutions (pH 11) having a 10–13 percent dry substance content were prepared as described by Swanson et al., Ind. Eng. Chem., Prod. Res. Develop. 3: 22 (1964) and Doane et al., Die Staerke 17: 77 (1965). Each solution was used within 12 weeks after preparation (see Example 8, infra) since there is some decomposition and loss of D.S. after that time. The xanthate solutions were analyzed for dry substance starch and for xanthate groups from which D.S. and dry substance starch xanthate content based on the anhydroglucose unit (ACU) were calculated as described by Doane et al., supra.

Commercially obtained diepoxide crosslinking agents without further purification or modification were reacted with sodium starch xanthate. The following types of diepoxide compounds are considered suitable for use in the instant invention:

1,4-butanediol diglycidyl ether, and;

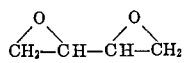

butadiene diepoxide. Any alkyl diepoxide of the above types having unsubstituted carbon or carbon-oxygen chains of from 0-8 units between the epoxide rings is considered to be equivalent to the compounds described above.

The stoichiometric reaction of sodium starch xanthate with a diepoxide is envisioned as follows:

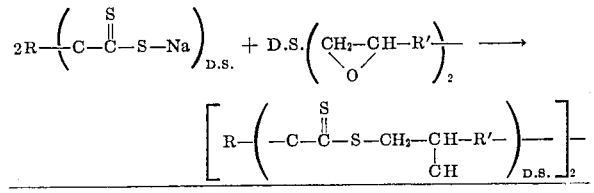

where R = starch, R' = —CH$_2$—O—CH$_2$-CH$_2$—, or $+$CH$_2$ $+_x$ where $x$ = 0–4, and D.S. = degree of substitution of sodium xanthate on the starch. According to the above stoichiometry, one sodium xanthate group reacts with one epoxide group. The ratio of epoxide groups to xanthate groups will be known herein as the S-ratio.

Attempts were made to follow the reactions by measuring viscosity development with a Brookfield viscometer, but this proved to be difficult since in most cases the reaction quickly produced too strong gels and solid precipitates. However, a few viscosity measurements are shown in Table 1.

Table 1

| Reactants | | Viscosity, cp | | | |
|---|---|---|---|---|---|
| Sodium starch | | hours of reaction | | | |
| xanthate, D.S. | S-ratio[1,2] | 4 | 28 | 52 | 76 |
| 0.11 | 2 | 1,700 | 4,700 | 4,400 | 4,100 |
| 0.27 | 2 | 2,000 | 17,000 | >20,000 | — |
| 0.48 | 2 | 18,000 | 11,000 | 10,200 | — |
| 0.13 | 5 | 28,000 | 29,000 | — | — |
| 0.31 | 5 | >100,000 | — | — | — |
| 0.48 | 5 | >100,000 | — | — | — |

1 Ratio of epoxide groups to sodium xanthate group.
2 Diepoxide, 1,4-butanediol diglycidyl ether.

Usually, when the gels attain viscosities over 10,000 cp, the spindle of the viscometer creates a hole or crack in the gel that does not close after the spindle is removed making further viscosity measurements useless.

Gel formation is a good indicator of crosslinking and reaction progress. Another such indicator is the disappearance of the yellow color, typical of the sodium starch xanthate solution after the alkyl diepoxides are added. The reactions were terminated at various times by pouring the reaction mixture into 95 percent ethanol to form a solid precipitate which was then analyzed for sulfur content by the method of White, Microchim. Acta, 807 (1962). Infrared (IR) absorption spectra were obtained on Nujol mulls between NaCl discs. The reactions shown in Table 2 were conducted in closed vials in order to more easily measure viscosity and to form products which could be manipulated for analysis. Reaction times were determined by sulfur analysis and ultraviolet absorption analysis of the supernatant reaction solution. Reactions were considered to be ended when all of the xanthate moieties in the starting material were reacted. No free sulfur was found in the reaction medium.

Table 2

| Xanthate D.S.[1] | S-ratio[2,3] | Reaction time | Product analysis | | | |
|---|---|---|---|---|---|---|
| | | | Appearance | C=O+ | %S | Calc. epoxide D.S. ratio |
| 0.13 | 1–1.5 | 0.5–8 | Fluid | — | — | — |
| 0.13 | 2 | 0.5–4 | Soft gel | — | — | — |
| 0.13 | 3 | 8 | Firm gel | — | — | — |
| 0.13 | 5 | 0.5–8 | Firm gel | No | — | — |
| 0.13 | 12 | 0.5 | Firm gel | No | — | — |
| 0.38 | 1–1.5 | 0.5–4 | Fluid | No | — | — |
| 0.38 | 2 | 0.5 | Soft gel | No | 8.84 | 2.0 |
| 0.38 | 2 | 0.5 | Soft gel | No | 9.19 | 1.7 |
| 0.38 | 3 | 0.5 | Firm gel | Yes | — | — |
| 0.38 | 5 | 0.5 | Firm gel | Yes | 7.65 | 3.1 |
| 0.38 | 5 | 0.5 | Firm gel | Yes | 7.77 | 3.0 |
| 0.48 | 1–1.5 | 0.5–4 | Fluid | No | — | — |
| 0.48 | 2 | 0.5 | Soft gel | No | — | — |
| 0.48 | 3 | 0.5 | Firm gel | Yes | — | — |

Table 2—Continued

| Xanthate D.S.[1] | S-ratio[2,3] | Reaction time | Appearance | C=O[+] | %S | Calc. epoxide D.S. ratio |
|---|---|---|---|---|---|---|
| 0.48 | 5 | 0.5 | Firm gel | Yes | — | — |
| 0.48 | 10 | 0.5 | Firm gel | Yes | — | — |

1 Calculated from sulfur analysis.
2 Ratio of epoxide groups per xanthate group.
3 Diepoxide, 1,4-butanediol diglycidyl ether.
4 Determined by IR at 5.75 μ.

As indicated in the table, the gelling rate and extent are dependent on the D.S. of the starch xanthate, being the least with the low D.S. and increasing as the D.S. increases. Gelling also depends upon the amount of epoxide used. Reactions with the starting materials having S-ratios of 1–1.5 did not result in appreciable gelling or viscosity increases at all D.S. levels and over reaction times extended to several days. Reaction products described in Table 2 as being firm gels when left overnight in their reaction vials, harden to form solid handleable masses. A handleable mass or product is defined herein as having the ability to be removed from its container without significant distortion. Those products described as being soft gels harden to form solid handleable films when their respective reactions are performed as described in the examples, infra. Times sufficient for handleable products to form depend on the D.S. level of the sodium starch xanthate and the amounts of alkyl diepoxide added. These times are usually from 8 to 72 hours. Prior art indicates the alkyl diepoxides will not react with starch except in the presence of catalyst or relatively high pH's, nor will they polymerize under the reaction conditions of the instant method. It was unexpected, therefore, when I discovered that alkyl diepoxides reacted with sodium starch xanthate in more than the supposed stoichiometric quantities (i.e., S-ratios greater than 1). The reactions were conducted at room temperature (about 25° C.) in the light in an aqueous medium having a pH of about 11.

Sulfur analysis of products obtained from reaction mixtures containing a twofold excess of epoxide groups indicates that 2 moles of epoxide groups (or 1 mole of diepoxide) per xanthate group had reacted. Similar reaction media containing a fivefold excess of epoxide groups produced a crosslinked material that contained only 3 moles of epoxide groups per mole of xanthate group. This limitation of epoxide addition indicates that the diepoxides are not polymerizing. Perhaps the presence of the xanthate group on the starch somehow activates starch hydroxyls, and the excess epoxide groups are reacting with these activated functional groups.

The existence of a carbonyl band at 5.75 μ in the IR spectra of the product obtained from the reaction of 1,4-butanediol diglycidyl ether with sodium starch xanthate is evidence that the epoxide has attached to a xanthate group which is on a secondary carbon adjacent to a carbon containing a hydroxyl group. Similar structures are known to spontaneously rearrange so that their IR spectra show a peak at 5.75 μ.

Reactions of sodium starch xanthates having low D.S. levels with alkyl diepoxides cast on a glass surface result in products which are thin, smooth, brittle, and clear. As the xanthate D.S. is increased, the resulting films become thicker, rougher, more opaque, and tougher. The effect of adding plasticizers such as glycerol, 1,4-butanediol, dipropylene glycol, and ethylene glycol to reaction mixtures containing the prescribed reactants in various combinations of xanthate D.S. levels and S-ratios is to increase the strength, flexibility, and elasticity of the products. Films were also cast which incorporated cotton cheesecloth, and random-piled and nonwoven fiber glass cloth, and woven fiber glass cloth. These showed a very significant synergistic effect on the strength of the resulting products, which in some cases were 20 to 50 times stronger than either the film or the cloth alone.

There is no preferred xanthate D.S. level, S-ratio, or amount of plasticizer within the operable limits of the instant method. It is my belief that from the procedures and discussions herein disclosed those skilled in the art can, without excessive amounts of experimentation, determine the reaction parameters and combination of reactants and additives which would result in products having the most useful physical properties for their purposes.

The reaction described above between sodium starch xanthate and alkyl diepoxides, when incorporated into the production of paper, results in products having increased wet and dry strength. However, in this application, the reaction is conducted under conditions that prevent formation of solid masses. This can be accomplished by using starch derivatives having low to medium xanthate D.S. levels (e.g., 0.1 to 0.2) and diepoxides in low S-ratios (e.g., about 2), by using short reaction times with materials having higher D.S. levels, by conducting the reaction in dilute solutions or by conducting the entire reaction in the papermaker's pulp suspension. For example, when a starch derivative having a xanthate D.S. of about 0.1 was reacted with 2 times the stoichiometric amount of 1,4-butanediol diglycidyl ether for up to 76 hours, the product remained a soft gel. A similar reaction conducted for 5 minutes ex situ (i.e., outside the paper-pulp slurry) and 2 hours in situ (i.e., in the paper pulp slurry) resulted in a product which had extraordinary resistance to the MIT fold test (see Example 24, infra). Reactions of sodium starch xanthates having D.S. levels of up to 0.6, with diepoxides in S-ratios of about 3, conducted in dilute solutions do not gel but form turbid suspensions. If the reaction medium is sufficiently dilute (see Example 20, infra), solid masses do not form upon standing for as long as 55 hours.

In one of the two preferred papermaking procedures, sodium starch xanthate and an alkyl diepoxide in preferred S-ratios of about 3 are reacted ex situ in an aqueous medium for about 5 minutes and reacted in situ for from 0.5 to 18 hours. In a reaction time of 0.5 hour essentially all the xanthate moieties have reacted as is indicated in Table 2, supra. However, Example 24, series 2, indicates reaction times of up to 6 hours result in some increase in paper strength. Levels of addition for the reactants is from 2.5 to 25 percent based on the dry weight of the paper pulp which, in the examples (infra), is an unbleached, softwood, sulfate papermaker's pulp containing 75 percent by weight moisture. The moisture was taken into account in calculating levels of addition. When the sodium starch xanthate D.S. level is high (about 0.6), a 2.5 percent level of addition in sufficient. At lower xanthate D.S. levels increasing the level of addition significantly increases the paper products' wet strength and resistance to the MIT fold test.

The second preferred procedure for producing paper is one in which the entire reaction of sodium starch xanthate with alkyl diepoxides is conducted in situ. Reactants in the same amounts as described above added separately to a papermaker's pulp suspension and allowed to react for the same lengths of time resulted in products of superior strength to those prepared by procedures described in the prior art, using commercial paper strength additives. Example 23, infra, indicates that, when the alkyl diepoxides are added first and sodium starch xanthate immediately after, there is a significant increase in retention over that obtained when the reverse procedure is used. All parameters other than those described above for the crosslinking reaction are considered to be those normally used in the production of paper.

The following examples are intended only to further illustrate the invention which is defined only by the claims.

Casting as Film: EXAMPLE 1

Reaction mixtures of the following three compositions were made, the first part (a) detailing the procedure. a. To 45 ml. of water were added 0.9 ml. (0.979 g., 3 times stoichiometric amount) of 1,4-butanediol diglycidyl ether (Araldite RD-2, technical grade, product of Ciba Products Company, Fair Laws, New Jersey) and 6 ml. (7.56 g.) of glycerol (certified reagent, Fisher Scientific Company, Fair Lawn, New Jersey). After mixing, 45 g. of an 8.68 percent, 0.15 D.S. sodium starch xanthate solution of pH 11 to 12 (made from ordinary pearl corn starch, product of CPC International, Inc., Englewood Cliffs, New Jersey) was weighed in quickly, and rapid mixing was continued until the mixture began to thicken or develop turbidity (a matter of a few minutes).

b. 45 ml. of water, 1.8 ml. (1.958 g.) of Araldite RD-2 6 ml. (7.56 g.) of glycerol, and 45 g. of a 10.10 percent 0.25 D.S. sodium starch xanthate solution.

c. 45 ml. of water, 4.0 ml. (4.351 g.) of Araldite RD-2 6 ml. (7.56 g.) of glycerol, and 45 g. of a 13.74 percent 0.51 D.S. sodium starch xanthate solution.

After the thickening point was reached, the mixtures were poured into a 145 mm. (5.75 in.) diameter glass Petri dish which was covered and set at ambient room conditions (25° C.) for 24 or 72 hours. The liquid which exuded was measured. The separated, solid disk that had formed was rinsed with water and dried on a glass plate in the room air, turning occasionally on the plate which had been coated lightly with Dow Corning 200 Fluid silicone, for several days.

The entire foregoing experiment was repeated with the elimination of glycerol in the recipes.

The principal observations are tabulated below:

| D.S. | Time (hr.) | Glycerol | Exuded liquid (ml.) | Comments on film |
|---|---|---|---|---|
| 0.51 | 24 | No | 25 | Thick, rough, firm, shriveled, opaque pad |
|  | 72 | No | 45 | Thick, rough, firm, shriveled, opaque pad |
|  | 24 | Yes | 35 | Thick, fairly smooth, pliable, opaque pad |
|  | 72 | Yes | 45 | Thick, fairly smooth, pliable, opaque pad |
| 0.25 | 24 | No | 13 | Thick, brittle, shriveled, opaque film |
|  | 72 | No | 22 | Thick, brittle, shriveled, opaque film |
|  | 24 | Yes | 9 | Thick, smooth, pliable, opaque film |
|  | 72 | Yes | 18 | Thick, smooth, pliable, opaque film |
| 0.15[1] | 24 | No | 0 | Thin, smooth, brittle, cracked, clear film |
|  | 72 | No | 0 | Thin, smooth, brittle, cracked, clear film |
|  | 24 | Yes | 0 | Thin, smooth, pliable, clear film |
|  | 72 | Yes | 0 | Thin, smooth, pliable, clear film |

[1] These casts from 0.15 D.S. xanthates do not separate from the dish walls but can be cut away. The clear films are yellow but transparent.

EXAMPLE 2

To 45 ml. portions of water added 3, 4, or 5 ml. (3.78, 5.04, or 6.30 g.) of glycerol and 0.34 to 1.70 ml. (0.369 to 1.845 g.) of 1,4-butanediol diglycidyl ether in multiples of 0.34 ml. Then weighed in and mixed rapidly 45 g. of a 10.93 percent 0.13 D.S. sodium starch xanthate solution, giving reaction mixtures with 1 to 5 times the stoichiometric amount of the ether. The mixtures were cast in the covered Petri dish for 3 days and then processed as in the preceding experiment.

The dried films were cut into strips Instron tested for tensile properties according to ASTM Designation D 882-64 T for thin plastic sheeting after equilibrating for 48 hours or more according to ASTM Designation D 618. An Instrong testing machine was used. The following table summarizes the results:

| S-ratio[1] | Glycerol[2] (%) | Elongation at break (%) | Breaking factor (lb./in.) | Tensile strength at break (p.s.i.) | Elastic modulus (p.s.i.) |
|---|---|---|---|---|---|
| 1 | 76 | No strength in wet cast, not handleable | | | |
| 2 | 76 | ... | 11 | 471 | 28,389 |
| 3 | 76 | 60 | 10 | 449 | 22,728 |

Table —Continued

| S-ratio[1] | Glycerol[2] (%) | Elongation at break (%) | Breaking factor (lb./in.) | Tensile strength at break (p.s.i.) | Elastic modulus (p.s.i.) |
|---|---|---|---|---|---|
| 4 | 76 | 11 | 12 | 535 | 27,877 |
| 5 | 76 | 72 | 5 | 232 | 13,242 |
| 3 | 102 | 132 | 5 | 154 | 1,493 |
| 5 | 102 | 134 | 4 | 155 | 1,949 |
| 3 | 128 | 91 | 1 | 33 | 469 |
| 5 | 128 | 60 | 1 | 30 | 156 |

[1] Ratio of epoxide groups per xanthate groups, or excess of epoxide groups based on stoichiometric reaction.
[2] As percent of sodium starch xanthate dry weight.

Those films made with 100 percent or more of glycerol are tacky, the tack increasing with the amount of glycerol, and adhere to glass, metal, and wood or paper fairly well.

EXAMPLE 3

To 45 ml. portions of water added 3 ml. (3.78 g.) of glycerol and increments of 1,4-butanediol diglycidyl ether to provide varying S-ratios. Then 45 g. of an 11.5 percent 0.25 D.S. sodium starch xanthate were weighed in, mixing accomplished rapidly, and the mixture cast in the Petri dish. Subsequent processing and testing as in Example 2 provided the following data:

| S-ratio[1] | Glycerol[2] (%) | Elongation at break (%) | Breaking factor (lb./in.) | Tensile strength at break (p.s.i.) | Elastic modulus (p.s.i.) |
|---|---|---|---|---|---|
| 2.8 | 73 | 46 | 6 | 383 | 23,411 |
| 4.2 | 73 | 31 | 6 | 208 | 21,605 |
| 5.6 | 73 | 43 | 3 | 133 | 7,713 |

[1] See table, Example 2.
[2] As % of sodium starch xanthate dry weight.

EXAMPLE 4

When casts, made in accord with recipes as in Examples 2 and 3 which contained 4 ml. of glycerol, were put on 1/16-inch mesh screens rather than glass to dry after being removed from the dish mold and washed, the resulting films were very pliable, tacky, clear, yellow, smooth on one side, and cleanly imprinted with the mesh of the screen on the other side, giving a non-slip surface. Shrinkage on drying was very slight because of the holding power of the coarse screen on the film, but the films were easily peeled from the screen. Tensile strength tests on the "ribbed" film revealed no significant strength variations from the "unribbed" films.

Attempts to cure and dry casts from 0.50 D.S. xanthates on the screen were not as successful as the sheet was rather thick (over 1 mm.) and opaque and although pliable tended to disfigure some in the late stage of drying.

EXAMPLE 5

Casting mixtures were made in accord with the practices of Examples 2 and 3 using varying amounts of glycerol and varying S-ratios of the epoxide, but using 0.14 and 0.22 D.S. sodium starch xanthate made from a different corn starch than the one used to make the 0.13 and 0.25 D.S. xanthates of Examples 2 and 3. These mixtures were cast in the Petri dish molds in which a full circle of cheesecloth had been placed. Casts were also made without cheesecloth. After the due processing, the films were rather clear and the cheesecloth was quite evenly impregnated in continuous appearance with no voids or flaws. The composites were tested for tensile properties on the Instron machine but an elastic modulus calculation was not operable because of the manner in which the test strips broke without much elongation.

| D.S. | S-ratio[1] | Glycerol[2] (%) | Elongation at break (%) | Break factor (lb./in.) | Tensile strength at break (p.s.i.) | Appearance |
|---|---|---|---|---|---|---|
| 0.14 | 2 | none | 175 | 1.1 | 48 | ...[3] |
|  | 2 | 76 | 38 | 6.5 | 354 | Flexible, no tack |
|  | 3 | 76 | 30 | 13.6 | 670 | Flexible, no tack |
|  | 3 | 102 | 28 | 10.8 | 500 | Very flexible, some tack |
|  | 3 | 128 | 35 | 11.7 | 543 | Very flexible, most tack |
| 0.22[4] | 5 | none | 161 | 1.2 | 71 | ...[3] |
|  | 2 | 69 | 32 | 10.9 | 710 | Opaque, flexible |
|  | 5 | 69 | 20 | 14.3 | 845 | Opaque, flexible |
|  | 5 | 92 | 29 | 6.8 | 444 | Opaque, flexible |
|  | 5 | 115 | 24 | 7.3 | 474 | Opaque, flexible |

[1] See table, Example 2.
[2] As % of the sodium starch xanthate dry weight.
[3] No cheesecloth in these.
[4] Only a half of the normal reaction mixture was cast at this D.S.

These data illustrate a synergistic effect of combination of cheesecloth and derivative as the cheesecloth alone has a break factor of 7 to 8 pounds per inch.

EXAMPLE 6

To 45 ml. of water were added 3 ml. (3.78 g.) of glycerol and 2 or 3 times the stoichiometric amount of the diepoxide of Example 1. Then 45 g. portions of either an 11.23 percent 0.05 D.S. sodium starch xanthate, or a 10.94 percent 0.13 D.S. sodium starch xanthate, or an 11.24 percent 0.25 D.S. sodium starch xanthate, or a 13.21 percent 0.54 D.S. sodium starch xanthate solution made from the same starch as used in the xanthate preparations of Example 5 were weighed in and mixing accomplished. The mixtures were cast in the Petri dishes which contained a full-cut circle of a random-piled, nonwoven fiber glass cloth or a flat cloth of multifilament, fiber glass strips, about one-sixteenth-inch wide, woven loosely together at nine strips per inch, 7.5 ounces (Sears, Roebuck and Company, Chicago, Illinois). Casts were also made without fiber glass incorporation. Glycerol was added to all reaction mixtures at ca. 70 percent of the dry weight of sodium starch xanthate.

EXAMPLE 8

A study of the effect of the age of the sodium starch xanthate solution on film strength properties was made concurrent with Example 7, using the 0.05 D.S. starch derivative in the same recipe mixture as in Example 7. The strength test results on the films produced showed no effects due to the aging of the xanthate solution through the time steps 1, 7, and 12 weeks. The individual strength values were in very excellent agreement with those in the table of Example 7 relating to the 0.05 D.S. xanthate.

EXAMPLE 9

A. To 45 ml. of water was added a 3 times stoichiometric amount of the diepoxide of Example 1. Then added 3 ml. (3.78 g.) of glycerol, 3 ml. (2.88 g.) of Epoxol 8-2B plasticizer (product of Swift and Company, Chicago, Illinois), or 3 ml. of Flexol EPO plasticizer (product of Union Carbide Corporation, New York, New York). Epoxol and Flexol and epoxidized linseed oil and soybean oil plasticizers. Next 45 g. of a 9.48 percent 0.12 D.S. sodium starch xanthate solution or an 11.03 percent 0.22 D.S. sodium starch xanthate solution was weighed in and mixed. The mixtures

| Fiber glass | D.S. | S-ratio[2] | Elongation at break (%) | Break factor (lb./in.) | Tensile strength at break (p.s.i.) | Elastic modulus (p.s.i.) |
|---|---|---|---|---|---|---|
| None | 0.05 | 3 | 251 | 1.4 | 67.8 | 306 |
| None | 0.13 | 3 | 168 | 1.8 | 51.9 | 283 |
| None | 0.25[1] | 5 | 103 | 0.6 | 41.3 | 102 |
| None | 0.54[1] | 5 | 25 | 4.1 | 79.7 | 48.1 |
| Nonwoven | cloth only | | 12 | 3.2 | 35.6 | 327 |
| Nonwoven | 0.05 | 3 | 36 | 61.6 | 2,005 | 9,117 |
| Nonwoven | 0.13 | 3 | 42 | 44.8 | 1,493 | 5,817 |
| Nonwoven | 0.25 | 3 | 33 | 56.0 | 1,835 | 7,951 |
| Woven | cloth only | | 49 | 78.4 | 10,454 | 31,490 |
| Woven | 0.05 | 3 | 57 | 157.0 | 20,055 | 47,874 |
| Woven | 0.13 | 2 | 45 | 146.0 | 19,200 | 44,802 |
| Woven | 0.54 | 2 | 35 | 140.0 | 15,318 | 69,978 |

[1] Only a half recipe mixture was cast.
[2] See table, Example 2.

After due processing the composite films were tested for strength properties. Again a synergistic effect in the reinforcement was noted.

EXAMPLE 7

To 45 ml. of water were added 3 ml. (3.78 g.) of glycerol and 3 times the stoichiometric amount of the diepoxide of Example 1. Then 45 g. portions of the 0.05 D.S. or the 0.13 D.S. sodium starch xanthates of Example 6 were mixed in and casts for film formation were made in the Petri dishes. The castings were processed into dried films as before and these were tested for their strength properties after storing at room conditions for varied time periods.

were cast and processed. After drying, the only pliable films were those containing glycerol. All the others were brittle, cracked, and oily feeling.

It was noted that the Epoxol seemed to promote faster reaction and turbidity development during mixing, and Flexol seemed to diminish the amount of shrinkage during curing.

B. To 45 ml. of water added 1 ml. (1.09 g.) of the diepoxide of Example 1. The amount of diepoxide is 3 times the stoichiometric amount needed for the amount of xanthate to be used. Next 3 ml. of one of the following agents was added as plasticizer:
1. 1,4-butanediol, P6526 practical, (2) dipropylene glycol, P4773 practical, (3) 1,2,6-hexanetriol, P6693

| D.S.[1] | Storage time (wks.) | Elongation at break (%) | Break factor (lb./in.) | Tensile strength at break (p.s.i.) | Elastic modulus (p.s.i.) |
|---|---|---|---|---|---|
| 0.05 | 6 | 216 | 1.3 | 64.3 | 476 |
| 0.13 | 6 | 200 | 1.7 | 58.0 | 374 |
| 0.05 | 12 | 172 | 1.2 | 61.3 | 505 |
| 0.13 | 12 | 226 | 2.6 | 81.2 | 836 |
| 0.05 | 16 | 191 | 1.1 | 58.7 | 622 |
| 0.13 | 16 | 230 | 1.9 | 62.4 | 439 |

[1] Glycerol is present in all reaction mixtures at ca. 70 percent of the dry weight of sodium starch xanthate.

practical, (4) triethylene glycol, P2828 practical, and (5) ethylene glycol, 133; all products of Eastman Organic Chemicals, Distillation Products Industries, Rochester, New York.

After mixing, 45 g. of a 10.12 percent 0.12 D.S. sodium starch xanthate solution was added. The mixture was rapidly and well stirred until signs of thickening appeared and then poured into the Petri dish to cast. After being in the cast for 18 hours the soft, solid sheets were floated out of the dishes in water, rinsed gently, and processed through drying as before.

ether, 0.34 ml. (0.38 g.) of butadiene diepoxide (product of Columbia Organic Chemicals, Columbia, South Carolina), or 0.81 ml. (0.90 g.) of glycerol diglycidyl ether, (Aerite 100, product of Shell Chemical Company, New York, New York). Forty-five g. of a 10.46 percent 0.11 D.S. sodium starch xanthate solution was weighed in and the mixtures were cast.

The mixture made with glycerol digylcidyl ether did not result in the formation of a solid entity and evaporation of liquid left a gummy deposit. The solid casts were processed, dried, and tested.

| Epoxide[1] | D.S. | Elongation at break (%) | Break factor (lb./in.) | Tensile strength at break (p.s.i.) | Elastic modulus (p.s.i.) |
|---|---|---|---|---|---|
| Butanediol diglycidyl ether | 0.11 | 228 | 1.3 | 69.7 | 199 |
| Butadiene diepoxide | 0.11 | 169 | 0.6 | 36.3 | 81 |

[1] Glycerol as plasticizer at 80 percent of dry weight sodium starch xanthate.

All cast sheets were easily removable and handleable. After drying for about 4 days, the films with the butanediol or dipropylene glycol were somewhat intermediate in pliability and could be broken on sharp bending. Films with hexanetriol or triethylene glycol on the other hand were very brittle and cracked upon slight bending. They also had a white surface bloom. None of the films had an oily feel or surface as did those of Example 9A which contained Epoxol of Flexol.

Only the film made with ethylene glycol had a pliability approaching that of film made with glycerol as plasticizer. After about 3 weeks of drying at room conditions even the film with ethylene glycol becomes rather brittle, although remaining without bloom, whereas films with glycerol seem to remain flexible indefinitely.

EXAMPLE 11

To 45 ml. portions of water added 3 ml. (3.78 g.) of glycerol. Then added 1,4-butanediol diglycidyl ether in multiples of 0.25 ml. increments starting with 0.50 ml. to provide mixtures with 2, 3, 4, and 5 times the stoichiometric amount of the ether. Next 45 g. of a 9.48 percent 0.11 D.S. sodium starch xanthate solution made from a high-amylose content corn starch (Amylon 7, National Starch and Chemical Corporation, New York, New York) was weighed in and the mixtures were cast in the Petri dishes. After the usual processing, the strength character of the films was determined. It was noted that the films from the high amylose starch were about twice as thick as those from ordinary corn starch.

| S-ratio[1] | Glycerol[2] (%) | Elongation at break (%) | Break factor (lb./in.) | Tensile strength at break (p.s.i.) | Elastic modulus (p.s.i.) |
|---|---|---|---|---|---|
| 2 | 90 | No strength in wet cast, not handleable | | | |
| 3 | 90 | 70 | 6.8 | 123 | 901 |
| 4 | 90 | 113 | 5.5 | 97 | 1,380 |
| 5 | 90 | 310 | 6.7 | 124 | 1,860 |

[1] See table, Example 2.
[2] As % of dry weight sodium high-amylose-starch xanthate.

EXAMPLE 10

To 45 ml. of water added 3 ml. (3.78 g.) of glycerol. Then added one of the following quantities of diepoxide, each representing a 3 times stoichiometric amount—0.82 ml. (0.89 g.) of 1,4-butanediol diglycidyl To 45 ml. protions of water added 3 or 4 ml. of glycerol. Then added 1.06 ml. of the above epoxide to provide mixtures with 3 times the stoichiometric amount of epoxide. Next 45 g. of a 10.30 percent 0.23 D.S. sodium high-amylose-starch xanthate solution was weighed in, mixed, and the film castings made, etc.

| Ratio,[1] epoxide/xanthate | Glycerol[2] (%) | Elongation at break (%) | Break factor (lb./in.) | Tensile strength at break (p.s.i.) | Elastic modulus (p.s.i.) |
|---|---|---|---|---|---|
| 3 | 81 | 62 | 9.4 | 170 | 2,321 |
| 3 | 108 | 120 | 9.9 | 161 | 2,402 |

[1] See table, Example 2.
[2] As % of dry weight high-amylose-starch xanthate.

Casting in Molds:

EXAMPLE 12

To 15 ml. of water was added 1.14 ml. (1.24 g., 3 times the stoichiometric amount) of 1,4-butanediol diglycidyl ether (Araldite RD-2, technical grade, product of Ciba Products Company, Fair Lawn, New Jersey). Then quickly 15 g. of a 12.69 percent 0.44 D.S. sodium starch xanthate solution of pH 11.5 to 12 (made from ordinary pearl corn starch product of CPC International, Inc., Englewood Cliffs, New Jersey) was weighed in and the mixture was rapidly stirred until it showed signs of thickening and turbidity, a matter of just a few minutes. At this point the mixture was poured into a mold: (1) a plastic box with embossed letters, (2) a glass tube, or (3) a cup making mold. The molds were allowed to set overnight at about 25° C. or room temperature. Inspection of the molds showed a solid, yellowish mass in the shape of the mold, separated from surfaces of the mold, and surrounded by exuded liquid. The solid masses were easily removed from the molds, washed with water, and dried several hours.

When this procedure was repeated using a stoichiometric or twice stoichiometric amount of the epoxide, unhandleable casts were obtained, respectively being a mushy suspension and a soft gel.

When this procedure was repeated with a 3 times stoichiometric amount of the diepoxide in reaction with 0.12 D.S. or 0.24 D.S. sodium starch xanthate in place of 0.44 D.S., the casts from the lowest D.S. xanthate could not be removed from the molds, having exuded essentially no liquid; and those from the intermediate D.S. xanthate could be removed only with difficulty, having exuded only a small amount of liquid.

When this procedure was repeated every 2 days with an 0.42 D.S. xanthate over a 2-week period, no detectable differences in the casting characteristics were noted, indicating no effect due to xanthate age within this time period.

EXAMPLE 13

To 15 ml. of water was added 1 ml. (1.26 g.) or 2ml. (2.52 g.) of glycerol (certified reagent, Fisher Scientific Company, Fair Lawn, New Jersey) or 1 ml. (0.96 g.) or 2 ml. (1.92 g.) of Epoxol 8-2B plasticizer (product of Swift and Company, Chicago, Illinois). Then added 1.31 ml. (1.43 g., 3 times the stoichiometric amount) of 1,4-butanediol diglycidyl ether. In the manner of Example 12, 15 g. of a 13.49 percent sodium starch xanthate solution (0.49 D.S.) was weighed in and the mixture processed as in Example 12. The casting was in a cup mold. The casts were removed, washed, and subjected to drying as follows. One of each composition was placed on a wire screen to dry in the ambient room conditions and one of each composition was placed on a wire screen to dry in a desiccator over $P_2O_5$ under vacuum at ambient room conditions. Every 48 hours the casts were weighed until essentially constant weight was reached in 8 days. The characteristics of the dried casts related to the plasticizer use as follows:

| Plasticizer | Trimness | Plasticizer retention[1] |
|---|---|---|
| 1 ml. glycerol | 2nd softest | 72% |
| 2 ml. glycerol | softest | 69% |
| 1 ml. Epoxol | hardest, oily surface | 100% |
| 2 ml. Epoxol | 3rd softest, oily surface | 100% |

[1] By weight determination.

Attempts to simulate the preceding experiment with glycerol, but with 10-ml. and 5-ml. amounts of water in place of 15 ml. and casting in the lettered box mold, resulted in an evenly dried, sharply detailed, pliable plate only when 10 ml. of water was used and drying was done in the desiccator. Because of the rapid reaction, mixing is difficult and lumps are hard to avoid before getting the mixtures into the molds even in the case of 10 ml. of water usage.

EXAMPLE 14

To 10 ml. of water added 1.28 ml. (1.395 g., 3 times stoichiometric amount) of 1,4-butanediol diglycidyl ether. Then added small portions of the dye materials listed below, all except the carbon black dissolving. Next, in the manner of Example 12, 15 g. of 12.57 percent sodium starch xanthate solution (0.52 D.S.) was added and the stirred mixtures were cast in a small funnel. The casts were removed, washed, and dried in the ambient room air. The high D.S. of the xanthate here and the lesser amount of water used results in more shrinkage and distortion than occurs with a ca. 0.40 D.S. xanthate. All gave acceptable products with the desired color.

| | |
|---|---|
| 1. Brom cresol purple | 6. None |
| 2. Carbon black | 7. Halopont blue |
| 3. Potassium permanganate | 8. Methylene blue |
| 4. Sudan black B | 9. Brom thymol blue |
| 5. Congo red | 10. Cresol red |

When the foregoing recipe was altered to contain 15 ml. of water and the casts were made in the cup mold or the lettered box mold, the dried casts were evenly dried and colored with sharp detail.

EXAMPLE 15

To 15 ml. of water added 1.32 ml. (1.440 g., 3 times the stoichiometric amount) of 1,4-butanediol diglycidyl ether, and 1.61 g. of either calcium carbonate (125 mesh) or Darco Grade 60 carbon black (product of Atlas Powder Company, Wilmington, Delaware). Mixed well and weighed in 15 g. of an 11.92 percent sodium starch xanthate solution (0.58 D.S.) quickly, mixed further until viscosity development became apparent and then cast in the cup mold or the lettered box mold. The casts were removed, washed, and dried. The cup casts were somewhat pliable, with little distortion and shrinkage. The lettered box cast with carbon had little shrinkage and the lettering was quite clear and sharp. However, the box cast with carbonate was not good, and a blooming tendency of the carbonate destroyed the lettering detail.

Attempts to simulate the above experiment with 0.24 D.S. xanthate resulted in mushy casts.

EXAMPLE 16

To 15 ml. of water added 0.439 g. (3 times stoichiometric amount) of butadiene diepoxide (product of Columbia Organic Chemicals, Columbia, South Carolina). Then weighed in 15 g. of an 11.10 percent sodium starch xanthate solution (0.44 D.S.), mixed well, and let set in a glass tube. Although the behavior of this reaction mixture and the casting was much the same as those of Example 12, the resulting dried cast was more shriveled, brittle, and fragile than those of Example 12.

When this procedure was repeated with a 0.24 D.S. xanthate and 3 times the stoichiometric amount of the diepoxide, a very brittle cast was also obtained.

Incorporation with Papermaking Pulp:

EXAMPLE 17

To 15 ml. of water added 0.50 ml. (0.55 g.) of 1,4-butanediol diglycidyl ether (Araldite RD-2, technical grade, product of Ciba Products Company, Fair Lawn, New Jersey). The amount of the diepoxide is 3 times the stoichiometric amount of 1 mole of epoxide group per mole of xanthate group to be used. Then 15 g. of an 8.96 percent 0.24 D.S. sodium starch xanthate solution was weighed in and mixed rapidly until reaction was underway as evidenced by thickening and clouding. The mixture was set at room conditions for 1 hour, at which time it was a soft, yellow, opaque, slow-running gel. The gel was stirred into about 400 ml. of water to disperse.

The dispersed gel was stirred into a 1,400 ml. suspension of unbleached, softwood, sulfate, papermaker's pulp (30 g. of 75 percent moisture, 800 ml. SR freeness pulp, product of Bemis Company, Inc., Peoria, Illinois, that had been soaked in ca. 600 ml. water and gently disintegrated in a Waring Blendor prior to final dilution).

The treated pulp suspension was set at room conditions for 3 hours, at which time the pulp had settled about one-third through the volume in the 2-l. beaker. Some clear water was decanted and then the beaker was inverted over a 1/16-inch mesh wire screen to permit drainage and formation of a thin mat. The mat was dried in the room air for several days. During drying and after drying, it was noted that the mat of treated pulp had a lighter hue and the surface appeared to have a denser or less-loose packing array of fibers than did a control mat made of untreated pulp in the same screen-forming technique. Also when dry, the treated mat was somewhat stiffer to hand. A portion of the dried mat was ground in a Wiley mill to 60 mesh and analyzed for sulfur content; found—0.25 percent, d.b. This content represents ca. 13 percent retention of the added sulfurous derivative, after allowing for a blank sulfur content of ca. 0.10 percent in the pulp itself.

EXAMPLE 18

To 250 ml. of water added the same amounts of diepoxide and xanthate as in Example 17. Mixed well and set for 1 hour. A milky suspension developed. This was added to a suspension of paper pulp in the same manner as in Example 17 and another mat was formed.

The character of this mat was much the same as that formed in Example 17. The analysis of the ground mat showed 0.25 percent sulfur, d.b., corresponding to ca. 13 percent retention of additive.

EXAMPLE 19

To ca. 1,400 ml. of water added the same amounts of diepoxide and xanthate as in Example 17. Let set at room conditions for 3 hours. The mixture became faintly turbid and a very small amount of solid sediment was noticeable on the bottom.

A 600-ml. suspension of the paper pulp prepared as in Example 17 was added. The mixture was set at room conditions for 3 hours and then a mat was formed. This mat was also much the same as the mat of Example 17. Analysis of a ground portion showed 0.23 percent sulfur, d.b., corresponding to ca. 13 percent retention of additive.

EXAMPLE 20

To 1,600 ml. of water added 15 g. of an 11.22 percent 0.22 D.S. sodium starch xanthate solution and 0.56 ml. (0.61 g.) of the diepoxide of Example 17. The amount of diepoxide is 3 times the stoichiometric amount of 1 mole epoxide group per mole of xanthate group. Mixed well and let set. By 7 hours a faint turbidity had developed. After 48 hours the turbidity was much more prominent and a fine precipitate was appearing. A 30-g. portion of the paper pulp, dispersed in 450 ml. of water, was stirred in and the mixture was processed into a mat.

EXAMPLE 21

To 15 ml. of water added 0.22 ml. (0.24 g.) of butadiene diepoxide (product of Columbia Organic Chemicals, Columbia, South Carolina) and 15 g. of the same xanthate used in Example 17. The amount of epoxide is 3 times the stoichiometric amount of 1 mole of epoxide group per mole of xanthate group. The mixture was set at room conditions for 1 hour. The ensuing gel was much stiffer than that of Example 17 and would not flow. It was gently broken up in a Waring Blendor in ca. 400 ml. of water.

It was added to a pulp suspension as in Example 17. In the 3-hour standing period, the pulp settled about one-third in the beaker. The character of the mat was much the same as that of Example 17, but analysis of the ground, dry mat for sulfur content found 0.22 percent d.b., indicated only 10 percent retention of added derivative.

EXAMPLE 22

In about 250 ml. of water 15 g. of the pulp described in Example 17 was soaked for an hour, broken up with a stirring rod, and gently beaten (to a small vortex appearance) in a blendor. Then 2.98 g. of a 10.91 percent 0.26 D.S. sodium starch xanthate solution was slowly added to the beating pulp and mixing carried on about 5 minutes more. Then 0.13 ml. 0.146 g.) of the diepoxide of Example 17 was added dropwise while beating and an additional 5 minutes of beating was accomplished. The suspension was transferred to a beaker to set overnight (16–18 hours). In a matter of about 15 minutes a light, cloudy appearance developed in the suspension, without settling. The suspension was diluted to 800 ml. in a 1-liter beaker and formed into a mat. The mat was of noticeably lighter hue than a mat from an untreated pulp control. However, the determined sulfur content of the dried, treated mat indicated only a 7 percent retention of the treating product. The treated mat was somewhat stiffer to hand.

EXAMPLE 23

This experiment was carried out in the same manner as Example 22 except that the diepoxide was added to the beating pulp first, then the xanthate next. It was noted that the whitening appearance took about 2 hours in the setting step. Sulfur analysis indicated about 21 percent retention.

EXAMPLE 24

Three series of trials embodying variations and combinations of the procedures of Example 17–23 were established. The starch xanthates used were: 0.10 D.S., 11.41 percent sodium starch xanthate; 0.26 D.S., 10.91 percent sodium starch xanthate; and 0.57 D.S., 11.16 percent soidum starch xanthate. The diepoxide was that of Example 17.

The variations in procedures were as follows: Series 1 utilized a 5-minute ex situ (away from pulp) reaction between a given weight of the sodium starch xanthate solution and a given weight (3 times the stoichiometric amount) of the diepoxide in a weight of water equal to the weight of xanthate solution, followed by a 2-hour, unstirred, in situ (in presence of pulp) reaction of the ex situ reaction product after adding it to a 2-percent suspension (15 g. dry pulp in 750 ml. water) of pulp in a blendor with stirring. Series 2 was the same as Series 1 except that the length of the in situ reaction was varied. Series 3 involved only a constant in situ reaction in which during the pulp agitation process in the blendor the xanthate was added to the pulp first and then the diepoxide.

In each Series the treated 2-percent pulp suspensions were diluted to 6,250 g. with water (distilled used throughout), dropped to pH 7 with muriatic acid as needed, and processed into handsheets. The dried handsheets were tested for strength properties, according to TAPPI standard methods as follows:

| Test | | TAPPI Method No. |
|---|---|---|
| Burst strength | | T 403 ts-63 |
| Breaking length: | wet | T 456 os-68 |
| | dry | T 494 os-70 |
| MIT fold | | T 511 su-69 |

The results are in the following tables.

Series 1–5 minutes ex situ reaction, 2 hours in situ reaction, 2.5 percent addition level

| Xanthate D.S. | Burst factor | MIT fol | Breaking length, m. | |
|---|---|---|---|---|
| | | | Wet | Dry |
| 0.10 | 49.2 | 1,200 | 200 | 6,930 |
| 0.26 | 56.2 | 560 | 620 | 7,700 |
| 0.57 | 56.2 | 1,000 | 565 | 6,505 |
| Control | 40.1 | 260 | 155 | 6,350 |

Series 2–5 minutes ex situ reaction, varied in situ reaction, 2.5 percent addition level, 0.26 D.S. sodium starch xanthate

| in situ Time, hours | Burst factor | MIT fold | Breaking length, m. | |
|---|---|---|---|---|
| | | | Wet | Dry |
| 0.5 | 58.8 | 780 | 625 | 7,500 |
| 2.0 | 56.2 | 560 | 620 | 7,700 |
| 6.0 | 66.2 | 980 | 645 | 8,730 |
| Control | 40.1 | 260 | 155 | 6,350 |

Series 3–18 hours in situ reaction, varied addition level, varied D.S., other additives

| Additive | Xanthate D.S. | Addition level,% | Burst factor | MIT fold | Breaking length, m. | |
|---|---|---|---|---|---|---|
| | | | | | Wet | Dry |
| Experimental | 0.57 | 10 | 60.6 | 980 | 255 | 7,790 |
| Experimental | 0.26 | 10 | 66.3 | 880 | 245 | 7,980 |
| Experimental | 0.57 | 2.5 | 54.6 | 1,000 | 220 | 7,330 |
| Experimental | 0.26 | 2.5 | 56.6 | 590 | 225 | 7,390 |
| Experimental | 0.10 | 2.5 | 51.1 | 500 | 200 | 7,230 |
| Control | | | 40.1 | 260 | 155 | 6,350 |
| Gel'd. starch[1] | | 2.5 | 44.9 | 350 | 175 | 6,670 |
| Na starch xanthate | 0.10 | 2.5 | 42.4 | 345 | 180 | 6,480 |
| Comm. cat.[2] | ? | 2.5 | 64.2 | 715 | 180 | 8,490 |

[1] Gelatinized in same manner as used in making sodium starch xanthate with alkali.
[2] A commercial cationic starch product normally used as a strength-improving paper additive.

I claim:

1. A method of preparing molded articles and films which comprises reacting a sodium starch xanthate having a xanthate D.S. of from about 0.05 to about 0.6 with an excess of an alkyl diglycidyl ether or an alkyl diepoxide in an alkaline aqueous medium containing from 0 to about 200 percent, based on dry weight of said sodium starch xanthate, of a plasticizer, said excess being from about 2 to about 5 times the stoichiometric amount of one epoxide group per xanthte group in said sodium starch xanthate, the reaction being conducted in a mold for a time sufficient to allow formation of a solid mass that is then removed from said mold and allowed to dry.

2. Molded articles and films prepared by the method described in claim 1.

3. Molded articles and films prepared by the method described in claim 1 in which the alkyl diglycidyl ether is 1,4-butanediol diglycidyl ether and the alkyl diepoxide is butadiene diepoxide.

4. Molded articles and films as described in claim 2 which contain a dye in sufficient quantity to impart color to said articles and films, said dyes comprising brom cresol purple, carbon black, potassium permanganate, sudan black, congo red, halopont blue, methylene blue, brom thymol blue, or cresol red.

5. Molded articles and films as described in claim 2 wherein cheesecloth or fiber glass cloth is incorporated as a reinforcing agent.

* * * * *